(12) United States Patent
Kushwaha et al.

(10) Patent No.: US 11,320,842 B2
(45) Date of Patent: May 3, 2022

(54) SYSTEMS AND METHODS FOR OPTIMIZED CRUISE VERTICAL PATH

(71) Applicant: Rockwell Collins, Inc., Cedar Rapids, IA (US)

(72) Inventors: Dinesh K. Kushwaha, Bangalore (IN); Mark W. Volner, Marion, IA (US); Bradley R. Mickelson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 226 days.

(21) Appl. No.: 16/580,900

(22) Filed: Sep. 24, 2019

(65) Prior Publication Data

US 2020/0103924 A1 Apr. 2, 2020

(30) Foreign Application Priority Data

Oct. 1, 2018 (IN) .............................. 201811037080

(51) Int. Cl.
*G05D 1/00* (2006.01)
*G05D 1/04* (2006.01)
(Continued)

(52) U.S. Cl.
CPC ........... *G05D 1/1064* (2019.05); *B64D 45/00* (2013.01); *G05D 1/0027* (2013.01); *G05D 1/0088* (2013.01); *G05D 1/042* (2013.01); *G05D 1/1062* (2019.05); *G08G 5/0008* (2013.01); *G08G 5/0013* (2013.01); *G08G 5/0021* (2013.01); *G08G 5/0039* (2013.01)

(58) Field of Classification Search
CPC .... G05D 1/1064; G05D 1/042; G05D 1/0088; G05D 1/0027; G05D 1/1062; G05D 1/0607; G05D 1/00; G05D 1/10; G05D 1/04; G08G 5/0039; G08G 5/0008; G08G 5/0013; G08G 5/0021; G08G 5/0034; G08G 5/00; G08G 1/16; B64D 45/00
See application file for complete search history.

(56) References Cited

U.S. PATENT DOCUMENTS 4,760,530 A * 7/1988 Liden ................... G05D 1/0005
700/36
6,148,259 A * 11/2000 Hagelauer ............ G05D 1/0005
701/122
(Continued)

OTHER PUBLICATIONS

Wing et al., "For Spacious Skies: Self-Separation with "Autonomous Flight Rules" in US Domestic Airspace", American Institute of Aeronautics and Astronautics, Sep. 2011. 13 pages.
(Continued)

*Primary Examiner* — Yonel Beaulieu
(74) *Attorney, Agent, or Firm* — Suiter Swantz pc llo

(57) ABSTRACT

A system includes a processing circuit onboard an aircraft and configured to determine an optimum cruise profile for the aircraft based on a flight plan, a characteristic of the aircraft, and an environmental characteristic. The processing circuit is also configured to determine an optimized cruise vertical path based on the optimum cruise profile and air traffic information of at least one other aircraft, and control an autopilot system of the aircraft to cause the aircraft to follow the optimized cruise vertical path.

20 Claims, 4 Drawing Sheets

(51) Int. Cl.
  *G05D 1/10* (2006.01)
  *G08G 5/00* (2006.01)
  *B64D 45/00* (2006.01)

(56) References Cited

U.S. PATENT DOCUMENTS

| | | | |
|---|---|---|---|
| 8,271,152 B2* | 9/2012 | Singer | G08G 5/0039 |
| | | | 701/4 |
| 8,280,626 B2* | 10/2012 | Klooster | G08G 5/0091 |
| | | | 701/415 |
| 8,417,397 B2* | 4/2013 | Khatwa | G01C 23/00 |
| | | | 701/14 |
| 8,538,669 B2 | 9/2013 | Agarwal et al. | |
| 8,798,922 B2 | 8/2014 | Tillotson et al. | |
| 8,942,914 B2* | 1/2015 | Subbu | G08G 5/0013 |
| | | | 701/120 |
| 9,177,480 B2* | 11/2015 | Subbu | G08G 5/0082 |
| 9,310,222 B1* | 4/2016 | Suiter | G01C 23/005 |
| 9,337,953 B1* | 5/2016 | Raghu | H04L 1/00 |
| 9,513,376 B1* | 12/2016 | Heinrich | G01S 19/49 |
| 10,467,913 B1* | 11/2019 | Suiter | G08G 5/0091 |
| 10,935,984 B2* | 3/2021 | Lax | G08G 5/0021 |
| 11,081,012 B2* | 8/2021 | Figlar | G01C 21/20 |
| 2015/0239575 A1* | 8/2015 | Sundararajan | G08G 5/0021 |
| | | | 701/14 |
| 2016/0275801 A1* | 9/2016 | Kopardekar | G08G 5/0069 |
| 2017/0069214 A1* | 3/2017 | Dupray | G08G 5/0013 |
| 2018/0005533 A1* | 1/2018 | Lohmiller | G08G 5/0052 |
| 2018/0067500 A1* | 3/2018 | Kim | G08G 5/0052 |
| 2018/0343050 A1* | 11/2018 | Tillotson | H04B 7/18506 |
| 2020/0290742 A1* | 9/2020 | Kumar | B64D 27/24 |

OTHER PUBLICATIONS

Office Action mailed in Indian Application No. 201811037080 dated Oct. 11, 2021, 6 pages.

* cited by examiner

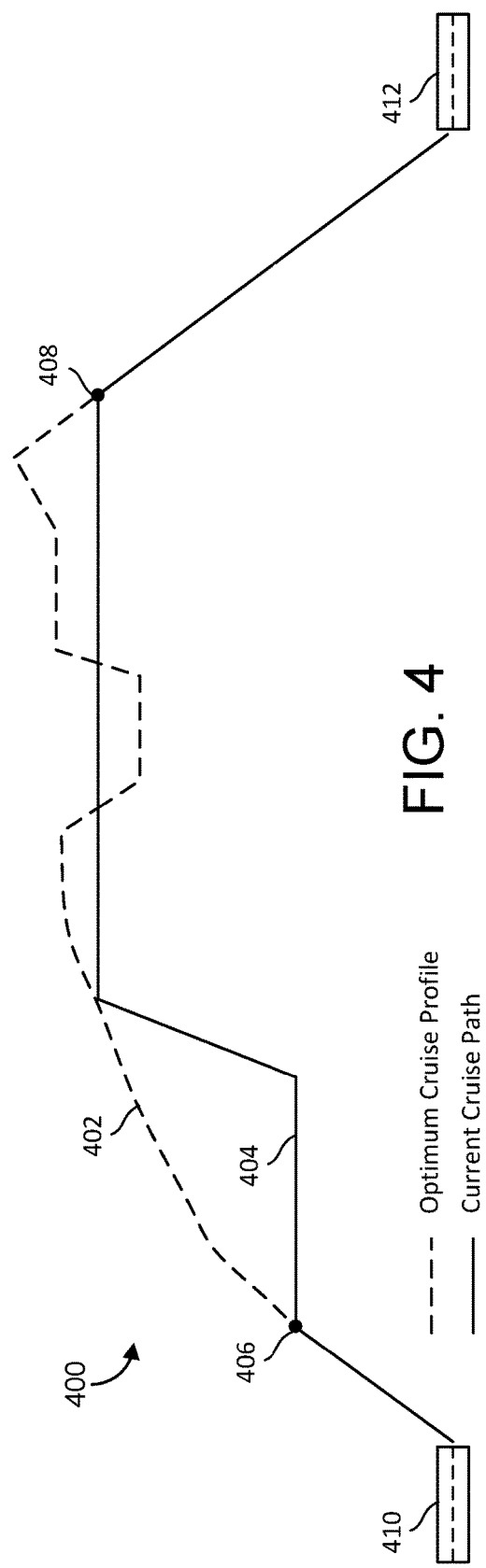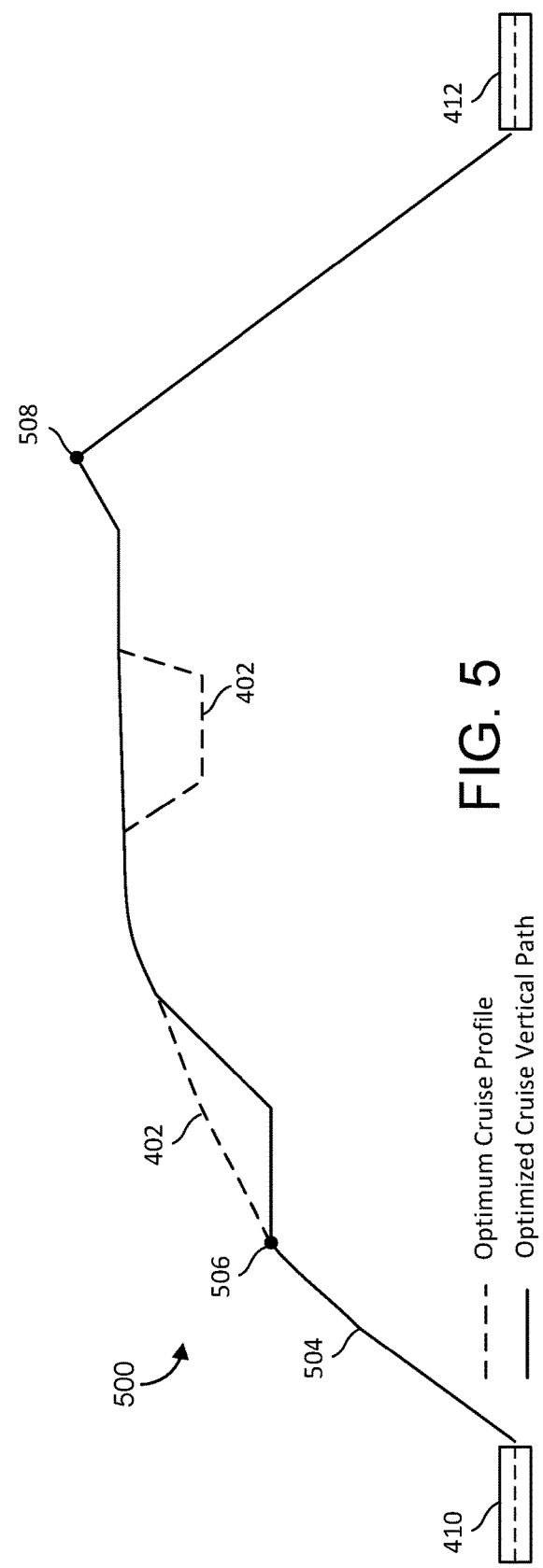

SYSTEMS AND METHODS FOR OPTIMIZED CRUISE VERTICAL PATH

BACKGROUND

This Application claims priority from Indian Provisional Application No. 201811037080, filed Oct. 1, 2018, entitled "SYSTEMS AND METHODS FOR OPTIMIZED CRUISE VERTICAL PATH", which is incorporated herein by reference in its entirety.

The present disclosure relates generally to the field of flight management systems. More particularly, embodiments of the present disclosure relate to systems for determining and implementing an optimized cruise vertical path.

Flying an aircraft along an optimum cruise profile to maximize a ground-specific range is desirable. For example, flying along the optimum cruise profile can result in greater fuel savings and faster speeds enabling an aircraft to reach its destination quicker. However, in practice, flying an aircraft along an optimum cruise profile cannot always be executed, for example, due to difficulties in obtaining the required clearances from air traffic control due to air traffic constraints in remote and oceanic airspaces (i.e., non-radar coverage areas).

SUMMARY

In one aspect, certain inventive concepts disclosed herein are directed to a system. The system includes a processing circuit onboard an aircraft and configured to determine an optimum cruise profile for an aircraft based on a flight plan, a characteristic of the aircraft, and an environmental characteristic. The processing circuit is further configured to determine an optimized cruise vertical path based on the optimum cruise profile and air traffic information of at least one other aircraft. The air traffic information includes an intended flight path for each of the at least one other aircraft. The optimized cruise vertical path includes a plurality of set points defining a more cost efficient flight path than a current flight path. The processing circuit is further configured to control an autopilot system of the aircraft to cause the aircraft to follow the optimized cruise vertical path.

In a further aspect, certain inventive concepts disclosed herein are directed to a method. The method includes determining an optimum cruise profile for an aircraft based on a flight plan, a characteristic of the aircraft, and an environmental characteristic. The method further includes determining an optimized cruise vertical path based on the optimum cruise profile and air traffic information of at least one other aircraft. The air traffic information includes an intended flight path for each of the at least one other aircraft. The optimized cruise vertical path includes a plurality of set points defining a more cost efficient flight path than a current flight path. The method further includes controlling an autopilot system of the aircraft to cause the aircraft to follow the optimized cruise vertical path.

In a further aspect, certain inventive concepts disclosed herein are directed to a system. The system includes a communications system and at least one processor coupled with the communications system and with a non-transitory processor-readable medium storing processor-executable code. The communications system is configured to broadcast ownship information of an aircraft and configured to receive broadcast information from at least one other aircraft. The processor-executable code is for causing the processor to determine an optimum cruise profile for the aircraft based on a flight plan, a characteristic of the aircraft, and an environmental characteristic. The processor-executable code is also for causing the processor to determine an optimized cruise vertical path based on the optimum cruise profile and air traffic information of the at least one other aircraft. The air traffic information is based on the received broadcast information and includes an intended flight path for the at least one other aircraft. The optimized cruise vertical path includes a plurality of set points defining a more cost efficient flight path than a current flight path. The processor-executable code is also for causing the processor to control a display system of the aircraft to provide the optimized cruise vertical path to a pilot of the aircraft. The communications system includes an Automatic Dependent Surveillance-Broadcast System having in/out capabilities

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 4 is a schematic illustration of an exemplary embodiment of an optimum cruise profile compared with a current cruise path;

FIG. 5 is a schematic illustration of an exemplary embodiment of an optimized cruise vertical path based on the optimum cruise profile of FIG. 4.

DETAILED DESCRIPTION

Figure 1:
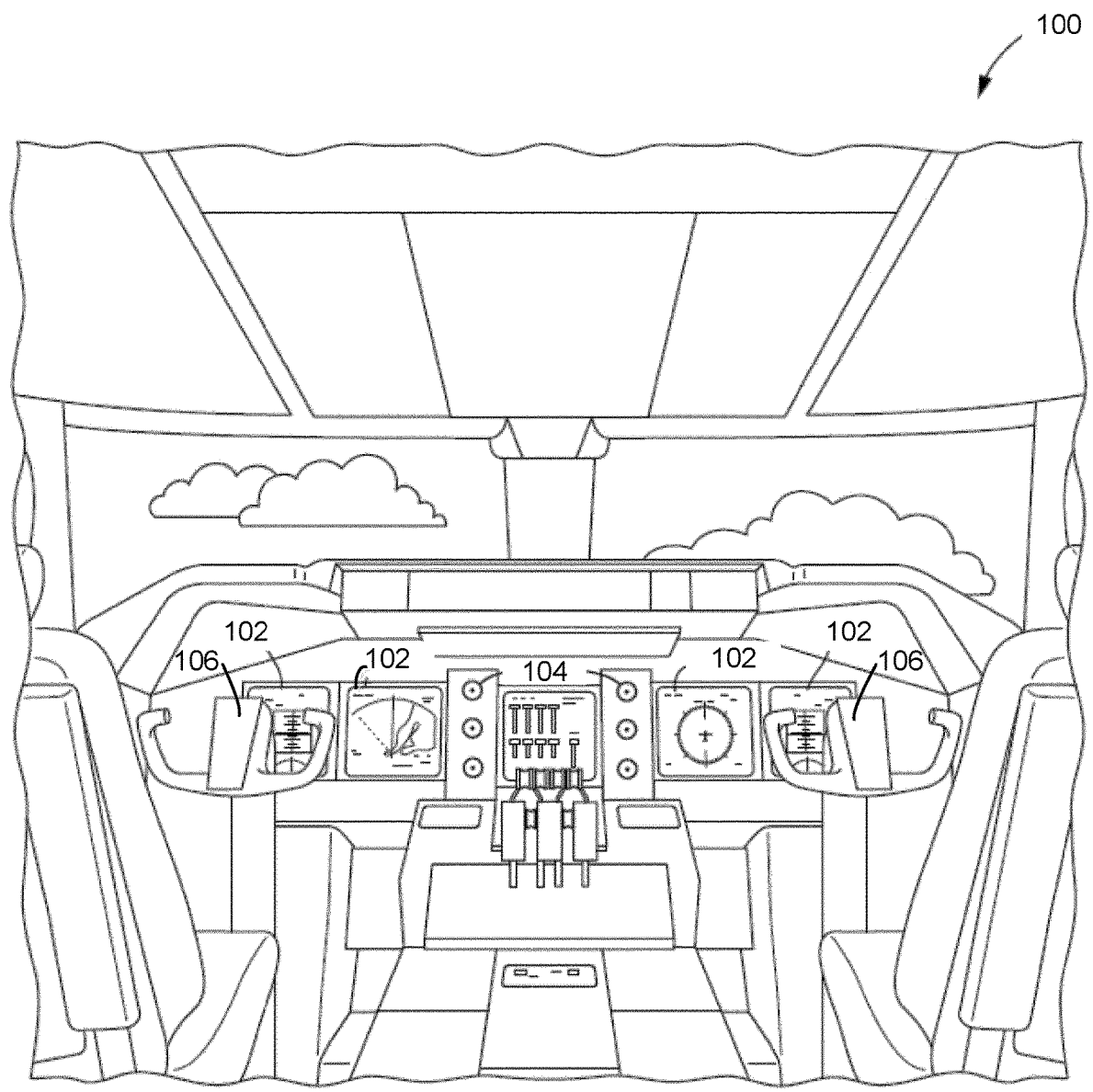
FIG. 1 is a schematic illustration of an exemplary embodiment of a control center of an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for optimized cruise vertical path. The inventive concepts disclosed herein can be utilized in a number of control systems for various types of applications, sensing systems, and display systems. While the present disclosure describes systems and methods implementable for an aircraft, the inventive concepts disclosed herein may be used in any type of environment (e.g., in another aircraft, a spacecraft, a ground-based vehicle, or in a non-vehicle application such as a ground-based display system, an air traffic control system, a radar system, a virtual display system). While certain examples and embodiments of the inventive concepts disclosed herein are described with respect to a pilot of an aircraft, it will be appreciated that users other than a pilot may use and benefit from the inventive concepts disclosed herein with respect to other vehicles, systems, and objects.

Referring now to FIG. 1, a schematic illustration of an exemplary embodiment of a control center of an aircraft is shown according to the inventive concepts disclosed herein. The aircraft control center 100 (or "cockpit") includes one or more flight displays 102, one or more user interface (UI) elements 104, and one or more flight controls 106. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art. According to various exemplary embodiments of the inventive concepts disclosed herein, at least one of the flight displays 102 may be configured to provide a rendered display from the systems and methods described herein.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system, or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information. Graphical representations of the displayed information may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, enable an aircraft crew member to interact with various avionics applications and perform functions such as data entry, manipulation of navigational maps, and moving among and selecting checklist items. For example, the UI elements 104 may be used to adjust features of the flight displays 102, such as contrast, brightness, width, and length. The UI elements 104 may also (or alternatively) be used by an aircraft crew member to interface with or manipulate the displays of the flight displays 102. For example, the UI elements 104 may be used by aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

The flight control 106 can be any type of instrument or mechanism (e.g., a yoke, center stick, side stick, cyclic, collective, rudder pedals, throttle) used to control a functionality of the aircraft. For example, the flight control 106 can be configured to control the basic maneuvering of the aircraft in terms of pitch and roll. In some embodiments, the flight control 106 can be configured to control additional functionalities or systems of the aircraft beyond the pitch and roll, such as an autopilot control (e.g., autopilot disengage), or in the case of a military aircraft, weapons and targeting systems.

Figure 2:
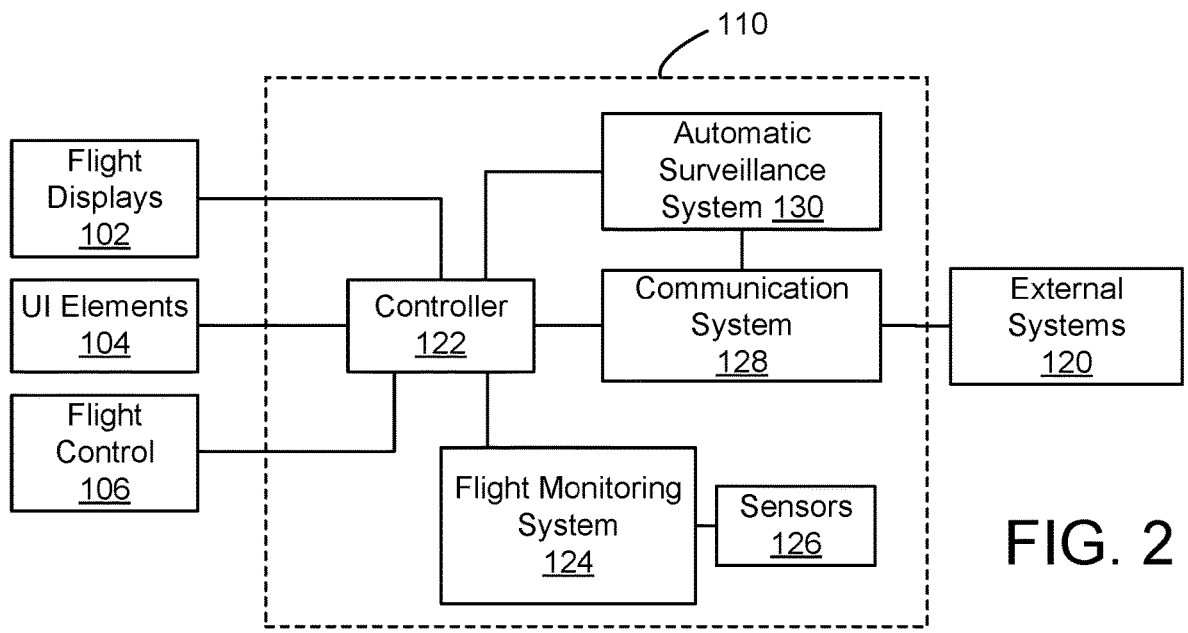
FIG. 2 is a block diagram of an exemplary embodiment of a cruise path optimization system including a controller.

Referring now to FIG. 2, a block diagram of an exemplary embodiment of a cruise path optimization system 110 including a controller 122 is shown according to the inventive concepts disclosed herein. The cruise path optimization system 110 includes the controller 122, a flight monitoring system 124, a plurality of sensors 126, a communication system 128, and an automatic surveillance system 130. The cruise path optimization system 110 can include other systems and components for general aircraft operation, such as a weather radar system.

The controller 122 is configured to send data to and receive data from, or otherwise facilitate electronic data communications with, the other systems of the cruise path optimization system 110 or with external systems 120, including other aircraft, satellite-based systems, or ground-based systems, such as an air traffic control tower. The controller 122 can interface with an aircraft control system, aircraft monitoring system, or other such system. The controller 122 can be configured to generally receive input from the various other systems, interpret the inputs to determine a condition of the aircraft and a desired control input based on the condition, and communicate with the flight displays 102, UI elements 104, and the flight control 106 to receive input and to provide an audible, haptic, or visual indication of an optimum cruise profile, an optimized cruise path, a current cruise path, etc. (e.g., via the flight displays 102, UI elements 104, and flight control 106). The structure of the controller 122 is shown in greater detail in FIG. 3 and the functionality of the controller 122 is explained in greater detail with respect to FIG. 3. In various embodiments, the controller 122 can be configured to perform any of the actions described herein using any of the various other systems of the cruise path optimization system 110 as described herein.

The plurality of sensors 126 can include, for example, one or more aircraft speed sensors (e.g., an airspeed sensor, a ground speed sensor), altitude sensors, fuel sensors, location tracking sensors (e.g., GPS), optical systems (e.g., camera system, infrared system), weather sensors (e.g., lightning sensors, turbulence sensors, pressure sensors, winds at altitude sensors), or any other aircraft sensors or sensing systems that may be used to monitor the location of the aircraft, the performance of the aircraft, or weather local to or remote from the aircraft. The plurality of sensors 126 may include one or more sensors configured to acquire data indicative of an indicated airspeed, a true airspeed, a ground speed, an angle of attack, a pitch angle, rotation speed, flare speed, and stall speed, among other aircraft operating characteristics. The sensors may be located in various positions on the aircraft, and a single sensor may be configured to acquire more than one type of sensor data. Data from the sensors 126 is provided to the controller 122 for further processing, display, and control of the aircraft by the cruise path optimization system 110 as described herein. The sensors 126 could also include off-board sensors that transmit information to the aircraft. For example, the sensors 126 can include or be configured to receive a sensor feed from an off-board sensor (e.g., a sensor of another aircraft or a ground sensor).

The flight monitoring system 124 may be or include at least one of a GPS, a Global Navigation Satellite System (GNSS), an attitude and heading reference system (AHRS), and an inertial reference system (IRS). The flight monitoring system 124 is configured to acquire flight data indicative of at least one flight characteristic of the aircraft. The flight characteristics may include, for example, a location of the aircraft, a ground speed, a vertical speed, a pitch angle, or an altitude of the aircraft.

The communication system 128 facilitates communications between the aircraft and external systems (e.g., a satellite system, other aircraft, a terrestrial station, or other air, space, or ground-based system). For example, the communication system 128 can send data to and receive data from external ground-based weather supplier systems and ground-based air traffic control systems. The communication system 128 can communicate with the external systems 120, such as an air traffic control system, using any type of communication protocol or network (e.g., via a mobile network, via one or more bi-directional or uni-directional communication channels) and can include any type of wired or wireless interface for facilitating the communication. For example, the communication system 128 can receive a confirmation or acceptance of a new optimized cruise vertical path from an air traffic control system after communicating a proposed new optimized cruise vertical path to the air traffic control system. It should be understood that the information received by the controller 122 as described in the present disclosure can come from any internal or external source.

The automatic surveillance system 130 is configured to communicate with the external systems 120 (e.g., other aircraft) via the communication system 128. For example, the automatic surveillance system 130 can communicate with other aircraft directly or indirectly (e.g., via a satellite) to determine the other aircraft's current flight path and intended flight path.

While shown in FIG. 2 as being separate from the communication system 128, in some embodiments, the automatic surveillance system 130 can be part of the communication system 128. In some embodiments, the automatic surveillance system 130 is an Automatic Dependent Surveillance-Broadcast System (ADS-B) having in/out technology. ADS-B out refers to a capability of the automatic surveillance system 130 being able to broadcast information (e.g., a position and other information about the aircraft) to the external systems 120 such that other aircraft can receive the information and known certain details of the aircraft (e.g., a flight plan of the aircraft, an intended vertical flight path of the aircraft). ADS-B in refers to a capability of the automatic surveillance system 130 being able to receive broadcast information and messages from the external systems 120 such that the aircraft can receive information regarding other aircraft (e.g., positions, flight plans, vertical flight paths). The automatic surveillance system 130 can thereby identify surrounding traffic and the intent of surrounding traffic (e.g., the lateral and vertical flight plans of the other aircraft).

Figure 3:
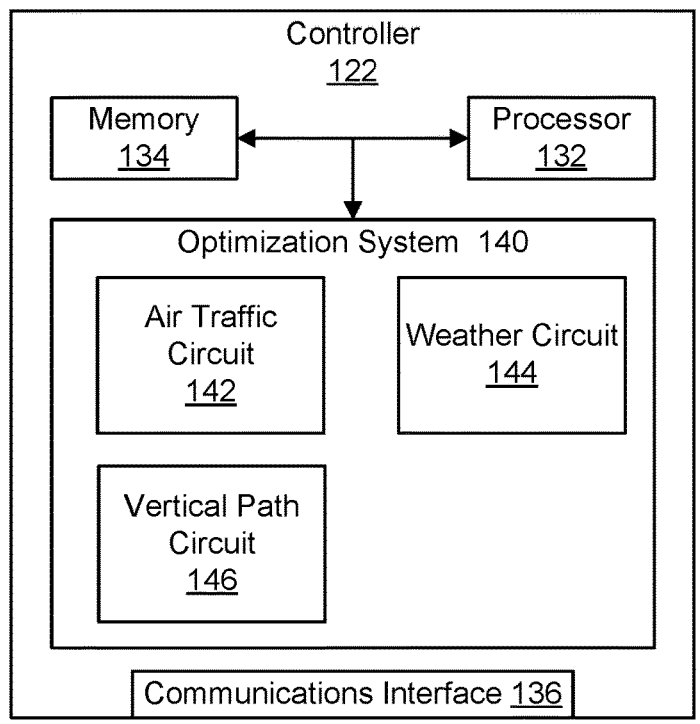
FIG. 3 is a block diagram of an exemplary embodiment of the controller of FIG. 2.

Referring now to FIGS. 3-5, an embodiment of the controller 122 is described with respect to schematics of an optimum cruise profile and an optimized cruise vertical path. Specifically, FIG. 3 is a block diagram of an exemplary embodiment of the controller 122 of FIG. 2 shown according to the inventive concepts disclosed herein. FIG. 4 is a schematic illustration 400 of an exemplary embodiment of an optimum cruise profile 402 compared with a current cruise path 404 shown according to the inventive concepts disclosed herein. FIG. 5 is a schematic illustration 500 of an exemplary embodiment of an optimized cruise vertical path 504 based on the optimum cruise profile 402 of FIG. 4 shown according to the inventive concepts disclosed herein.

Referring more specifically to FIG. 3, the controller 122 includes a processor 132, a memory 134, a communications interface 136, and an optimization system 140. The communications interface 136 is configured to facilitate communications between the controller 122 and the other components and systems of the cruise path optimization system 110. While the controller 122 is shown as including the processor 132 and the memory 134, it will be appreciated that the controller 122 does not necessarily require the processor 132 and the memory 134 and can include other components for carrying out the functions described herein with respect to the controller 122.

The processor 132 can be implemented as a general or specific purpose processor, an application specific integrated circuit (ASIC), one or more field programmable gate arrays (FPGAs), a group of processing components, or other suitable electronic processing components. The memory 134 is one or more devices (e.g., RAM, ROM, flash memory, hard disk storage) for storing data and computer code for completing and facilitating the various user or client processes, layers, and modules described in the present disclosure. The memory 134 can be or include volatile memory or non-volatile memory and can include database components, object code components, script components, or any other type of information structure for supporting the various activities and information structures of the inventive concepts disclosed herein. The memory 134 is communicably connected to the processor 132 and includes computer code or instruction modules for executing one or more processes described herein.

The memory 134 includes one or more memory devices for storing instructions that are executable by the processor 132 to carry out the functions of the cruise path optimization system 110. The memory 134 (e.g., RAM, ROM, Flash Memory, hard disk storage) can store various data and/or computer code for facilitating the various processes described herein. The memory 134 can be communicably connected to the processor 132 to provide computer code or instructions to the processor 132 for executing at least some of the processes described herein. Moreover, the memory 134 can be or include tangible, non-transient volatile memory or non-volatile memory. Accordingly, the memory 134 can include database components, object code components, script components, or any other type of information structure for supporting the various activities and information structures described herein.

The optimization system 140 includes an air traffic circuit 142, a weather circuit 144, and a vertical path circuit 146.

The air traffic circuit 142 can determine current and expected air traffic in an area of the optimum cruise profile 402. The air traffic circuit 142 can determine the current and expected air traffic based on information received from the automatic surveillance system 130. The current and expected air traffic can be based on the locations of the other aircraft and the flight path intent of the other aircraft. For example, the air traffic circuit 142 can determine the location and the intent of the other aircraft flying in the area of the optimum cruise profile 402 based on a flight plan received from the other aircraft. In another example, the air traffic circuit 142 can determine the location and intent of the other aircraft flying in the area of the optimum cruise profile 402 based on other information received from the other aircraft (e.g., a performance capability of the other aircraft, a lateral flight plan, a vertical flight plan, a scheduled takeoff time, a takeoff delay). In some embodiments, the air traffic circuit 142 can cooperate with the weather circuit 144 to predict an air traffic pattern based on a weather condition. For example, the air traffic circuit 142 can predict a likely reroute path of another aircraft due to a developing weather condition (e.g., a thunderstorm, turbulence, a wind shear, a wind direction, a wind magnitude, a temperature) within the current path of the other aircraft.

The weather circuit 144 is configured to determine an environmental condition in an area of the optimum cruise profile 402. The weather circuit 144 can determine a current and an expected weather condition in an area of the optimum cruise profile 402 based on information received from a weather radar system onboard the aircraft and based on information received from the external systems 120 (e.g., a ground station, an air traffic control authority, a weather station). The weather condition can include a thunderstorm, turbulence, a wind shear, a wind direction, a wind magnitude, a temperature, etc.

Referring specifically to FIGS. 4 and 5, the illustration 400 of the optimum cruise profile 402 compared with the current cruise path 404 includes the optimum cruise profile 402 and the current cruise path 404 is plotted from a take-off location 410 and a landing location 412. The current cruise path 404 includes a top of climb 406 and a top of descent 408. In some embodiments, the current cruise path 404 is based on a pre-approved air traffic control clearance or pre-assigned altitudes.

The illustration 500 of the optimized cruise vertical path 504 based on the optimum cruise profile 402 includes the same optimum cruise profile 402 of FIG. 4 and the optimized cruise vertical path 504 plotted from the same take-off location 410 and the same landing location 412 of FIG. 4. The optimized cruise vertical path 504 includes a top of climb 506 and a top of descent 508 that are both different from the top of climb 406 and the top of descent 408 of FIG. 4.

The top of climb 406, 506 represents the top of a climb of an aircraft where the aircraft finishes at least an initial ascent and transitions into a cruise phase of flight. In some embodiments, the top of climb 406, 506 may be a top of an initial climb, in which case an aircraft ascends later during the cruise phase. For example, the optimized cruise vertical path 504 may dictate that an aircraft initially level off its ascent before later on ascending again to reach the highest point of its cruise phase due to a wind condition (e.g., the wind having a different characteristic in one altitude along the optimum cruise profile 402 than at another location along the optimum cruise profile 402).

The top of descent 408, 508 represents the transition of an aircraft from the cruise phase to entering a descent phase. In some cases, the top of descent 408, 508 is where the aircraft begins a final descent for landing. As shown in FIGS. 4 and 5, the top of descent 408 is shown to be on the current cruise path 404 and not the highest point of the optimum cruise profile 402, whereas the top of descent 508 is shown to be at the highest point of the optimum cruise profile 402 which coincides with the highest point of the optimized cruise vertical path 504.

The top of descent 408, 508 can be used by the vertical path circuit 146 to determine a cost of flying either the current cruise path 404 or the optimized cruise vertical path 504. For example, additional fuel efficiency is gained by flying at a higher and faster altitude (e.g., entering a descent at the top of descent 508) versus entering a descent at a lower altitude (e.g., the top of descent 408). For example, a descent started from a higher altitude (e.g., the top of descent 508) uses less fuel than a descent started at a lower altitude (e.g., top of descent 408) and can result in the aircraft being in idle or near idle for a longer time period during the descent, which reduces fuel consumption. For example, the highest that an aircraft begins its descent, the more the aircraft can be driven by gravity instead of its engines during a descent.

Returning more particularly to FIG. 3, the vertical path circuit 146 is configured to compute or otherwise determine an optimized cruise vertical path 504. The optimized cruise vertical path 504 can be a vertical path that follows the optimum cruise profile 402 as close as possible due to air traffic constraints and weather constrains. For example, the optimized cruise vertical path 504 is a vertical path cleared of surrounding air traffic based on the intent of the surrounding air traffic (e.g., as determined by the air traffic circuit 142 using information from the automatic surveillance system 130), cleared of any adverse weather conditions such as turbulence (e.g., as determined by the weather circuit 144), and following favorable weather conditions such that the aircraft operates with a favorable wind direction (e.g., the aircraft travels eastward within an eastward wind stream, where the wind characteristics are determined by the weather circuit 144). In some embodiments, the vertical path circuit 146 is configured to compute or otherwise determine an optimized cruise vertical path 504 as air traffic conditions and as weather conditions change. For example, the optimized cruise vertical path 504 can be determined constantly, at set waypoints along the current cruise path 404, periodically, after a certain amount of time has elapsed, after a certain amount of fuel burn, or based on a weather condition threshold (e.g., a temperature increase or decrease, a change in wind direction, a change in wind magnitude). In some embodiments, the optimized cruise vertical path 504 is based on achieving a minimum fuel burn taking into account an aircraft performance characteristic, the surrounding traffic, and forecast and measured environmental conditions.

The vertical path circuit 146 can replace an active flight plan with an updated flight plan that incorporates the optimized cruise vertical path 504. In some embodiments, the vertical path circuit 146 automatically replaces the active flight plan with the updated flight plan including the optimized cruise vertical path 504 without receiving clearance from an air traffic control authority based on the aircraft operating under autonomous flight rules.

The vertical path circuit 146 is configured to determine the optimum cruise profile 402. The optimum cruise profile 402 is based on a flight plan of an aircraft, a characteristic of the aircraft, and an environmental characteristic of the aircraft. For example, the characteristic of the aircraft can be a predicted gross weight of the aircraft including the aircraft and cargo of the aircraft. In another example, the characteristic of the aircraft is a performance model of the aircraft (e.g., based on performance characteristics of the aircraft). For example, the optimum cruise profile 402 can be based on the best altitude for the aircraft to fly at to achieve optimized fuel usage.

In another example, the flight plan of the aircraft can include at least one of a plurality of lateral waypoints, a cruise altitude, a cost index, and a weather forecast. The cost index can be based on a fuel savings, a time saving, and the top of descent 408, 508. The cost index can further be based on or correspond with a particular ground specific range (e.g., from the take-off location 410 to the landing location 412). The weather forecast can include at least one of a wind direction, a wind magnitude, and an environmental temperature, each at any altitude that the aircraft is capable to fly at. The optimum cruise profile 402 can also be based on a fuel efficiency of the aircraft, such that the optimum cruise profile 402 corresponding to the most fuel-efficient vertical path the aircraft can travel.

The vertical path circuit 146 can compute the optimized cruise vertical path 504 based on the optimum cruise profile 402 and air traffic of at least one other aircraft. The air traffic of other aircraft is determined by the air traffic circuit 142 using information from the automatic surveillance system 130. The air traffic can include an intended flight path for each of the at least one other aircraft. The optimized cruise vertical path 504 can include a plurality of set points defining a path to reach an optimum altitude. For example, the vertical path circuit 146 can determine that the optimized cruise vertical path 504 follows a higher altitude instead of a lower altitude even if the higher altitude has less favorable wind conditions than the lower altitude (e.g., the wind at the higher altitude is blowing to slow the aircraft) if the lower altitude interferes with the planned route of another aircraft. In some embodiments, the vertical path circuit 146 determines the optimized cruise vertical path 504 based on autonomous flight rules. It will be appreciated that any autonomous flight rules can be used by the vertical path circuit 146 to determine the optimized cruise vertical path 504, such as rules adopted by a governing body such as the Federal Aviation Administration.

The vertical path circuit 146 can provide an input to an autopilot control system of the aircraft configured to automatically or substantially automatically fly the aircraft based on the optimized cruise vertical path 504. In some embodiments, the vertical path circuit 146 provides the optimized cruise vertical path 504 to a flight management system of the aircraft and to a display system of the aircraft (e.g., flight displays 102) for a pilot of the aircraft to follow.

The vertical path circuit 146 can negotiate clearances to follow the optimized cruise vertical path 504 with an air traffic control authority. The vertical path circuit 146 can control the communication system 128 to provide the optimized cruise vertical path 504 to an air traffic control authority and to receive clearance from the air traffic control authority for following the optimized cruise vertical path 504. In some embodiments, the optimized cruise vertical path 504 is provided to the air traffic control authority based on the aircraft operating under non-autonomous flight rules. The vertical path circuit 146 can automatically negotiate a clearance with an air traffic control authority, or can handle negotiating a clearance once approved by a pilot of the aircraft. In some embodiments, controlling the autopilot system of the aircraft according to the optimized cruise vertical path 504 is based on receiving a clearance for following the optimized cruise vertical path 504 from an air traffic control authority. In some embodiments, the vertical path circuit 146 can negotiate a clearance for only part of the optimized cruise vertical path 504 (e.g., a first segment but not a second segment), in which case, the vertical path circuit 146 can adopt only the part of the optimized cruise vertical path 504 that was cleared into the active flight plan and then negotiate the second segment of the optimized cruise vertical path 504 or a new optimized cruise vertical path 504 with an air traffic control authority at a later time.

Other circuits or components may be included in the memory 134 and the optimization system 140, such as a display circuit configured to render a display on or provide display data to one or more of the flight displays 102. The displayed information can generally include any of the information and data used or generated by the optimization system 140, such as the current cruise path 404, the optimum cruise profile 402, the optimized cruise vertical path 504, a comparison of the optimized cruise vertical path 504 with either or both of the optimum cruise profile 402 and the current cruise path 404, and providing information regarding a cost savings, a fuel saving, or a time savings to the pilot if the aircraft follows the optimized cruise vertical path 504. The displayed information can include other information as well, such as weather information or information derived from communications with the external systems 120. In some embodiments, the displayed information can be presented as an alert or be presented along with an alert, such as a tactile or audible alert. The display can be any type of display, such as a three dimensional display and a vertical situation display device. The display can depict the aircraft in a fixed position on a display screen of the display device.

Figure 6:
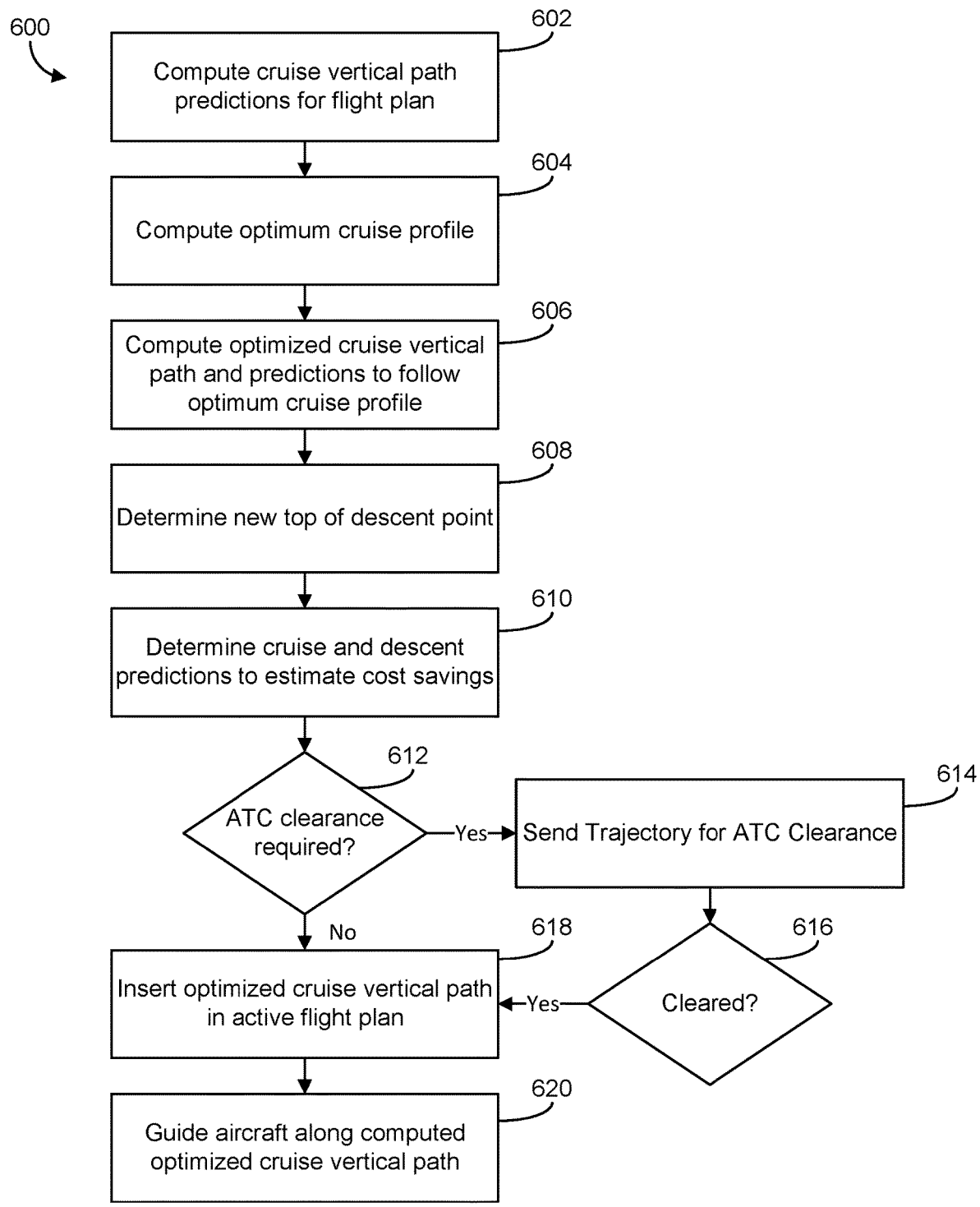
FIG. 6 is a diagram of an exemplary embodiment of a method of guiding an aircraft according to an optimized cruise vertical path according to the inventive concepts disclosed herein.

Referring now to FIG. 6, an exemplary embodiment of a method 600 according to the inventive concepts disclosed herein may include one or more of the following steps.

A step (602) may include computing cruise vertical path predictions for a flight plan. A step (604) may include computing an optimum cruise profile. A step (606) may include computing an optimized cruise vertical path and predictions to follow the optimum cruise profile. A step (608) may include determining a new top of descent point. A step (610) may include determining cruise and descent predictions to estimate cost savings, such as fuel and time savings. A step (612) may include determining whether an air traffic control clearance is required to adopt the optimized cruise vertical path. A step (614) may include sending a trajectory for air traffic control clearance to an air traffic control authority if an air traffic control clearance is required to adopt the optimized cruise vertical path. A step (616) may include determining whether a clearance is received from the air traffic control authority for adopting the optimized cruise vertical path.

A step (618) may include inserting the optimized cruise vertical path in an active flight plan if it is determined at step 616 that clearance is received from the air traffic control authority for adopting the optimized cruise vertical path or if it is determined that at step 612 that an air traffic control clearance is not required to adopt the optimized cruise vertical path. A step (620) may include guiding the aircraft along the computed optimized cruise vertical path. A pilot can manually guide the aircraft along the computed optimized cruise vertical path or an aircraft autopilot system can guide the aircraft along the computed optimized cruise vertical path.

As will be appreciated from the above, systems and methods for optimized cruise vertical path according to embodiments of the inventive concepts disclosed herein may enable an aircraft to fly closer to an optimum cruise profile, enable an aircraft to fly at variously changing altitudes, enable an aircraft to change altitudes more safely, enable an aircraft to change altitudes without receiving prior approval from an air traffic control authority, enable an aircraft to automatically negotiate a clearance from an air traffic control authority, reduce separation standards between aircraft, result in cost savings for operators, and reduce pilot workload.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system comprising:
    a processing circuit onboard an aircraft and configured to:
        determine an optimum cruise profile for an aircraft based on a flight plan, a characteristic of the aircraft, and an environmental characteristic;
        determine an optimized cruise vertical path based on the optimum cruise profile and air traffic information of at least one other aircraft, the air traffic information including an intended flight path for each of the at least one other aircraft, the optimized cruise vertical path including a plurality of set points defining a more cost efficient flight path than a current flight path; and
        control an autopilot system of the aircraft to cause the aircraft to follow the optimized cruise vertical path.

2. The system of claim 1, wherein the processing circuit is further configured to:
    provide the optimized cruise vertical path to an air traffic control authority; and
    receive clearance from the air traffic control authority for following the optimized cruise vertical path;
    wherein controlling the autopilot system of the aircraft is based on receiving the clearance.

3. The system of claim 2, wherein the optimized cruise vertical path is based on autonomous flight rules.

4. The system of claim 1, wherein the optimized cruise vertical path defines a top of descent at a higher altitude than a top of descent of the current flight path.

5. The system of claim 4, wherein the cost efficiency of the optimized cruise vertical path is based on a cost index savings.

6. The system of claim 5, wherein the cost index savings is based on at least one of a fuel savings and a time of flight, and wherein the cost index savings is based on the determined top of descent.

7. The system of claim 1, wherein the characteristic of the aircraft is at least one of a predicted gross weight of the aircraft including the aircraft and cargo of the aircraft and a performance model of the aircraft.

8. The system of claim 1, wherein the flight plan includes at least one of a plurality of lateral waypoints, a cruise altitude, a cost index, and a weather forecast.

9. The system of claim 8, wherein the weather forecast includes at least one wind direction, a wind magnitude, and an environmental temperature.

10. A method comprising:
    determining an optimum cruise profile for an aircraft based on a flight plan, a characteristic of the aircraft, and an environmental characteristic;

determining an optimized cruise vertical path based on the optimum cruise profile and air traffic information of at least one other aircraft, the air traffic information including an intended flight path for each of the at least one other aircraft, the optimized cruise vertical path including a plurality of set points defining a more cost efficient flight path than a current flight path; and controlling an autopilot system of the aircraft to cause the aircraft to follow the optimized cruise vertical path.

11. The method of claim 10, further comprising:

providing the optimized cruise vertical path to an air traffic control authority; and receiving clearance from the air traffic control authority for following the optimized cruise vertical path;

wherein controlling the autopilot system of the aircraft is based on receiving the clearance.

12. The method of claim 11, wherein the optimized cruise vertical path is provided to the air traffic control authority based on the aircraft operating under non-autonomous flight rules.

13. The method of claim 10, further comprising replacing an active flight plan with an updated flight plan incorporating the optimized cruise vertical path.

14. The method of claim 13, wherein the active flight plan is automatically replaced with the updated flight plan without receiving clearance from an air traffic control authority based on the aircraft operating under autonomous flight rules.

15. The method of claim 10, wherein the optimized cruise vertical path defines a top of descent, and further comprising estimating an advantage of following the optimized cruise vertical path, the advantage including a cost index savings.

16. The method of claim 15, wherein the cost index savings is based on at least one of a fuel savings and a time of flight, and wherein the cost index savings is based on the determined top of descent.

17. The method of claim 10, wherein the characteristic of the aircraft is at least one of a predicted gross weight of the aircraft including the aircraft and cargo of the aircraft and a performance model of the aircraft.

18. The method of claim 10, wherein the flight plan includes at least one of a plurality of lateral waypoints, a cruise altitude, a cost index, and a weather forecast, wherein the weather forecast includes at least one wind direction, a wind magnitude, and an environmental temperature.

19. A system comprising:

a communications system configured to broadcast ownship information of an aircraft and configured to receive broadcast information from at least one other aircraft; and at least one processor coupled with the communications system and with a non-transitory processor-readable medium storing processor-executable code for causing the at least one processor to:

determine an optimum cruise profile for the aircraft based on a flight plan, a characteristic of the aircraft, and an environmental characteristic;

determine an optimized cruise vertical path based on the optimum cruise profile and air traffic information of the at least one other aircraft, the air traffic information based on the received broadcast information and including an intended flight path for the at least one other aircraft, the optimized cruise vertical path including a plurality of set points defining a more cost efficient flight path than a current flight path; and control a display system of the aircraft to provide the optimized cruise vertical path to a pilot of the aircraft.

20. The system of claim 19, wherein the communications system includes an Automatic Dependent Surveillance-Broadcast System having in/out capabilities.

* * * * *